June 9, 1936.   N. A. SORENSON ET AL   2,043,781
REMOVAL OF ABRADING AND OTHER PARTICLES FROM SUSPENSION
Filed July 16, 1934
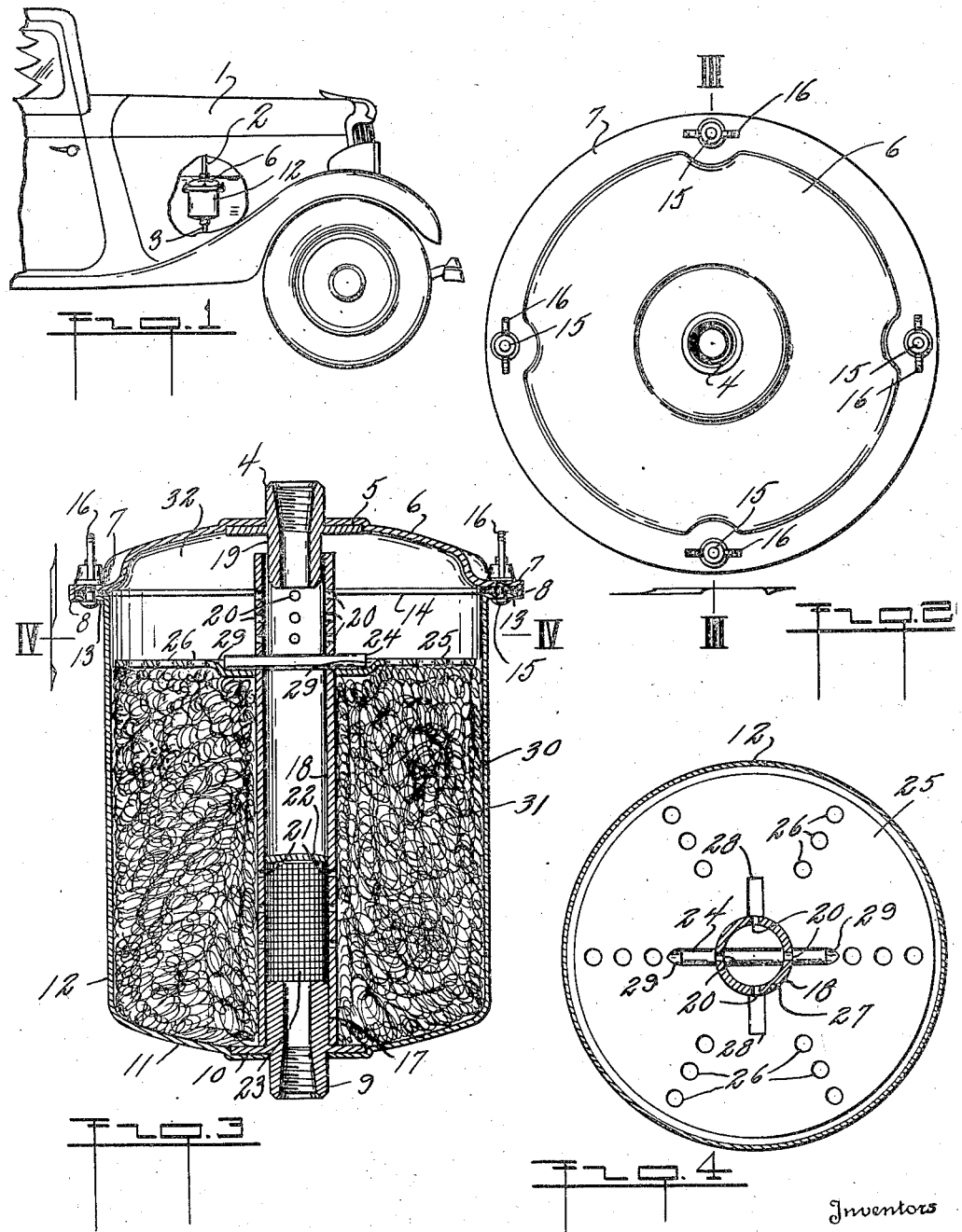

Patented June 9, 1936

2,043,781

UNITED STATES PATENT OFFICE 2,043,781

REMOVAL OF ABRADING AND OTHER PARTICLES FROM SUSPENSION

Niels A. Sorenson and Rudolph A. Walters, Fostoria, Ohio, assignors to The Fostoria Pressed Steel Corporation, Fostoria, Ohio, a corporation of Ohio Application July 16, 1934, Serial No. 735,394

3 Claims. (Cl. 210—131)

This invention relates to filtering or removing foreign material from liquids. It may be used in removal of particles from lubricants such as used in grinding or in force feed lubrication of machines including internal combustion engines of motor vehicles.

This invention has utility when incorporated in a chambered precipitant collection receptacle having entraining means as of horse hair, readily cleansed or replaced.

Referring to the drawing:

Fig. 1 is a side elevation, with parts broken away, showing an embodiment of the invention in a force feed lubrication system for internal combustion engines;

Fig. 2 is a plan view on an enlarged scale of the particle remover device of Fig. 1;

Fig. 3 is a section on the line III—III, Fig. 2; and

Fig. 4 is a section on the line IV—IV, Fig. 3.

A machine such as a motor vehicle 1 is provided with a lubricating system embodying pressure or force feed of a lubricant therethrough. A filter may be inserted in this system to have supply line 2 for delivering the lubricant thereto and a discharge line 3 for the lubricant from the filter. The intake 2 is assembled with fitting 4 having brazed assembly 5 with closure 6 of general disk form having marginal flange 7 and depending skirt 8. Outlet fitting 9 connected to the discharge 3 has brazed assembly 10 with end wall 11 of the general structure having cylindrical side wall 12 terminating away from the end wall 11 in outwardly extending flange 13 opposing the flange 7 of the closure 6. Gasket 14, spacing these flanges 7, 13, may be clamped by bolts 15 having wing nuts 16 thereon. There is thus provided a readily removable mounting for this closure 6 in completing the structure housing herein.

The fitting 9 has cylindrical portion 17 extending into the housing and there centering concentric tube 18, which registers with inward projection 19 from the intake fitting 4. This tube 18, adjacent the fitting portion 19 has lateral ports or openings 20. Remote therefrom and adjacent the fitting 17 this tube 18 has ports or openings 21. These ports 20 and 21 are adjacent the respective inlet and outlet openings of the housing or general chamber and are spaced from each other as to the tube 18 by diaphragm 22, expanded from its dished form into anchored position as a baffle isolating the ports 20 from the ports 21 of the tube 18. Between the fitting portion 17 and the diaphragm 22 screen 23 is provided, which herein may have a mesh of, say fifty to seventy-five openings per inch.

The tube 18 transversely thereof and adjacent the openings 20 has transversely extending pin 24. Disk or partition 25 is perforate with series of openings 26. Furthermore, this disk 25 has central opening 27 to extend about the tube 18 and additionally is provided with notches 28 and at an angular relation therefrom, concave seats 29. Chamber portion 30 of this housing has therein fibrous material 31 entraining particles of material in suspension, as metal or foreign matter in the lubrication system including products of corrosion and free carbon. This entraining material 31 is desirably of horse tail hair in lengths averaging, say twelve inches. This is a resilient mass which may be compressed in the chamber 30 by the partition or diaphragm 25, and as this perforate partition 25 is thrust along the tube 18 to have the pin 24 ride through the openings 28, angular shifting may occur to bring the seats 29 into register with the pin 24, with the resilient horse hair mass 31 springing this partition 25 back into locked position with the pin 24.

There is thus isolated from the chamber 30 intake chamber 32.

In the operations hereunder, pressure liquid supply as screw cutting oil or lubricant in metal working operations or the crank shaft cylinder lubrication oil as in a motor vehicle, enters from the pipe 2 through inlet fitting 4 to the tube 18 above the baffle 22 and flows therefrom by the lateral ports 20 into the chamber 32 and with less velocity than its entrance through fitting 4, passes through the series of openings 26 into the filtering mass of hair 31. In seeping therethrough to have the suspension particles removed, the flow into the tube 18 below the diaphragm or baffle 22, is permitted by the openings 21 and thence through the wire cloth 23 for pressure discharge through the fitting 9 at the outlet.

This horse hair under normal lubrication exposure is not prone to disintegrate. Furthermore, it is of a resilient body mass holding up even as loaded with foreign material or matters of suspension in the oil. In service there may be accumulation in this filter device, which has in practice been used up to eight thousand miles in motor vehicle service with efficiency still in removing particle accumulation from the circulating lubricant. However, the entraining mass may be easily cleansed, for the closure 6 is readily removed by backing off the wing nuts 16. The partition 25 is likewise readily taken out or removed by bringing the openings 28 in register with the pin 24 which allows the horse hair mass 31 to expand to lift outward this partition which is readily taken away and the mass 31 may be pulled out, shaken, washed say in gasoline and replaced.

Should the owner or operator so desire, the filler may be cast aside and a new charge placed in the chamber 30, with the partition 25 reassembled as also the closure 6. The device is then in condition for continuation of use with no depreciation. In fact the single charge of horse hair with repeated cleansing at intervals may have a life comparable with that of the motor vehicle. The set up in a machine or motor vehicle may be even in other than vertical position, with retention of efficiency in operation.

What is claimed and it is desired to secure by Letters Patent is:

1. In a device of the character described, the combination of a cylindrical chamber having an open end and an opposite closed end, a concentric tube in said chamber having inlet openings adjacent said open end of the chamber and outlet openings adjacent the closed end of the chamber, said tube having a baffle therein spacing said inlet openings from said outlet openings, a perforate partition outside the tube and in the chamber, fibrous entraining means in the chamber between the perforate partition and toward said outlet openings, said perforate partition being shiftable along the tube, holding means coacting between the tube and partition for maintaining the partition in entraining means compressing position about the tube toward the outlet openings, and a closure for the chamber open end.

2. In a device of the character described, the combination of a cylindrical chamber having an open end, a central tube in said chamber having lateral openings therefrom into the terminal portions of the chamber, a partition in the tube spacing said openings for inlet toward one end and outlet toward the other end, a perforate partition outside the tube, compressible fibrous entraining means in the chamber between the perforate partition and tube openings toward one end of the chamber, and a closure for the chamber spaced from the latter partition, adjacent which closure the other openings from the tube provide a way in communication with the perforate partition.

3. In a device of the character described, the combination of a cylindrical chamber having an open end, a concentric tube in said chamber having inlet openings adjacent one end of the chamber and outlet openings adjacent the other end of the chamber, said tube having a baffle therein spacing said inlet openings from said outlet openings, a perforate partition outside the tube and in the chamber, fibrous entraining means in the chamber between the perforate partition and toward said outlet openings, said perforate partition being shiftable along the tube in entraining means compressing position about the tube toward the outlet openings, and a closure for the chamber on the side of the partition toward the inlet openings.

NIELS A. SORENSON.
RUDOLPH A. WALTERS.